(12) United States Patent
Faheem et al.

(10) Patent No.: US 8,014,393 B1
(45) Date of Patent: Sep. 6, 2011

(54) BANDWIDTH OPTIMIZED RAPID CHANNEL CHANGE IN IP-TV NETWORK

(75) Inventors: Atif Faheem, Nashua, NH (US); Joshua B. Gahm, Newtonville, MA (US); Kapil Sharma, Acton, MA (US); David R. Oran, Acton, MA (US); Robert Andrew Drisko, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 12/367,183

(22) Filed: Feb. 6, 2009

Related U.S. Application Data

(60) Provisional application No. 61/086,238, filed on Aug. 5, 2008.

(51) Int. Cl.
*H04L 12/56* (2006.01)
*H04J 3/26* (2006.01)
(52) U.S. Cl. ........................ 370/390; 370/432; 370/468
(58) Field of Classification Search .................. 370/432, 370/395.64, 390, 235, 312, 468; 725/95, 725/100, 151, 110, 120
See application file for complete search history.

(56) References Cited

U.S. PATENT DOCUMENTS

| | | | |
|---|---|---|---|
| 7,535,903 B1 * | 5/2009 | Patel | 370/390 |
| 2005/0201406 A1 * | 9/2005 | Sekine et al. | 370/432 |
| 2005/0207417 A1 * | 9/2005 | Ogawa et al. | 370/390 |
| 2006/0075443 A1 * | 4/2006 | Eckert | 725/97 |
| 2006/0126667 A1 * | 6/2006 | Smith et al. | 370/486 |
| 2007/0044123 A1 * | 2/2007 | Zriny et al. | 725/52 |
| 2007/0076716 A1 * | 4/2007 | Jang | 370/390 |
| 2007/0121629 A1 * | 5/2007 | Cuijpers et al. | 370/390 |
| 2007/0268899 A1 * | 11/2007 | Cankaya | 370/390 |
| 2008/0137682 A1 * | 6/2008 | Kish et al. | 370/432 |
| 2008/0192839 A1 * | 8/2008 | Gahm et al. | 375/240.26 |
| 2008/0282301 A1 * | 11/2008 | Liu et al. | 725/100 |

* cited by examiner

*Primary Examiner* — Kwang B Yao
*Assistant Examiner* — Candal Elpenord
(74) *Attorney, Agent, or Firm* — Edell, Shapiro & Finnan, LLC

(57) ABSTRACT

A technique is provided for rapid channel change (RCC) processing in a programming distribution network. The RCC process herein is configured to transmit unicast stream of packets ("RCC burst") during a "fast-fill" interval for up to a full duration of the multicast join window, or until it is stopped by a an explicit message sent from the user terminal. The unicast stream of packets is transmitted at a full rate of an access link (i.e., the bottleneck link) on a path to the user terminal beyond an earliest time when the user terminal could join a multicast stream of packets for a new channel requested by the user terminal.

17 Claims, 4 Drawing Sheets

BANDWIDTH OPTIMIZED RAPID CHANNEL CHANGE IN IP-TV NETWORK

CROSS REFERENCE TO RELATED APPLICATION

This application claims priority to U.S. Provisional Patent Application No. 61/086,238, filed Aug. 5, 2008, the entirety of which is incorporated by reference.

TECHNICAL FIELD

The present disclosure relates to data distribution networks, and more particularly to channel change scenarios in Internet-Protocol Television (IP-TV) distribution systems.

BACKGROUND

In IP-TV distribution systems, a device known as a set top box (STB) receives a data (video and audio) stream for presenting a corresponding program. Each program channel has a corresponding data stream. Multiple data streams are transmitted as IP multicast streams over a distribution network to user terminals, with each channel sent to a separate multicast group. When a user of the STB desires to change channels, the STB may trigger what is known as a rapid channel change (RCC) request. A RCC server responds to the RCC request and assists in the delivery of packets associated with the "new" channel. Since it is possible that future system designs may involve integrating the functions of a STB into a television, the term "user terminal" is employed herein to more generally refer to the functions of a STB, whether in stand-alone form or integrated form.

The video for each channel is encoded in a format, such as Motion Picture Entertainment Group (MPEG) 2 or MPEG4, in which intra-coded frames occur only at fixed maximum intervals in the stream, known in MPEG2 as the Group Of Pictures (GOP) interval. It is further assumed that there is a "bottleneck link" in the network intervening between the RCC server and the STB, which is the link of lowest available capacity in this network path. A network that has bottleneck link may be referred to herein as a bandwidth-constrained network. For example, in a deployment in which the connection to the STB is a digital subscriber line (DSL) link, the DSL link is normally the bottleneck link.

Techniques are provided herein to handle a RCC request in a bandwidth constrained IP network. These techniques can be configured to use a minimal amount of bandwidth in the distribution network and also less memory in the user terminal than would be used with existing techniques.

DESCRIPTION OF EXAMPLE EMBODIMENTS

Overview

Figure 1:
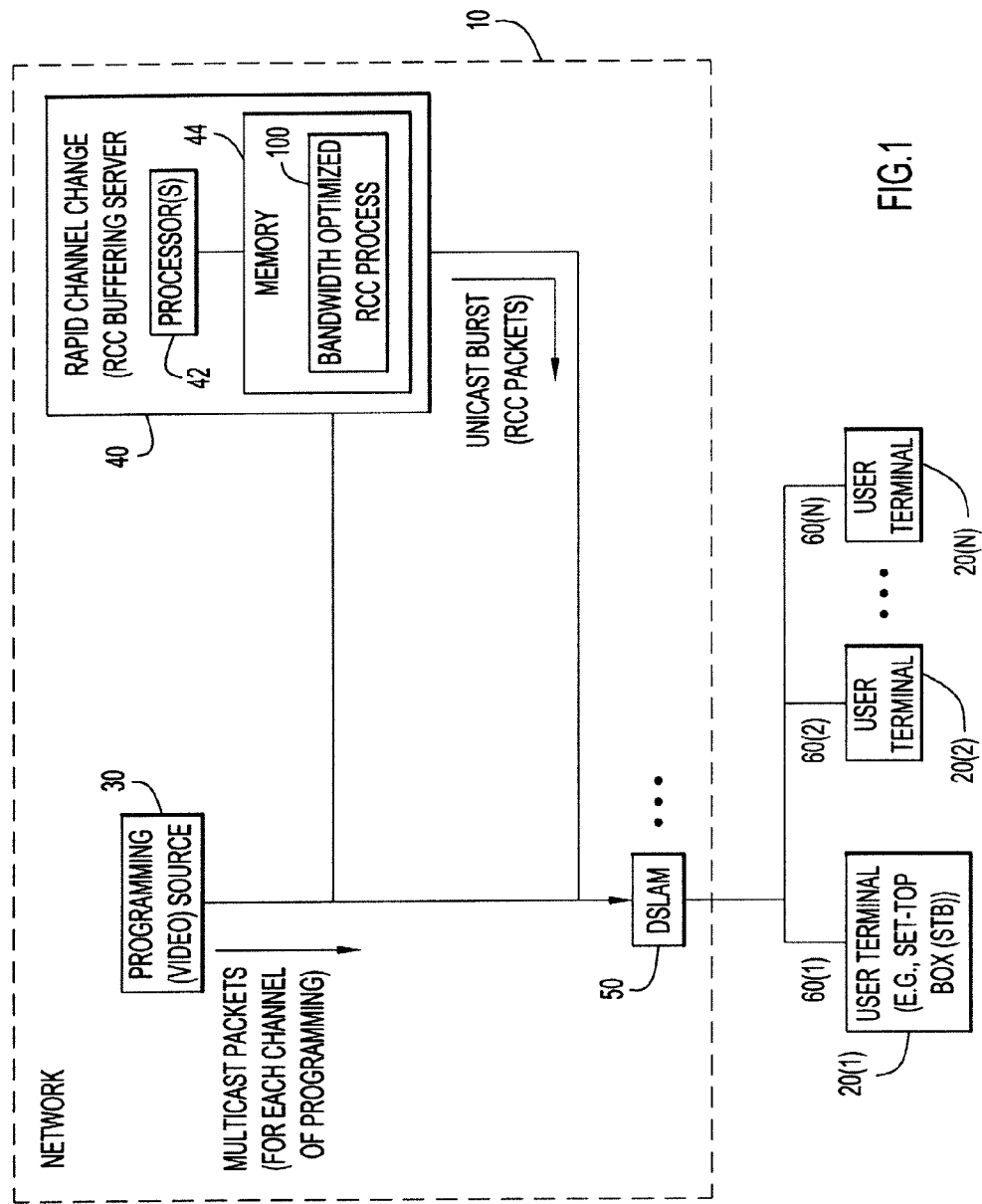
FIG. 1 is an example of a block diagram of a programming distribution network in which the bandwidth optimized rapid channel change techniques are employed.

A technique is provided for rapid channel change (RCC) processing in an IP-TV network. The RCC process described herein is configured to transmit unicast RCC packets ("RCC burst") during a "fast-fill" interval at a full rate of an access link (i.e., the bottleneck link) on a path to the user terminal beyond an earliest time when the user terminal could join a multicast stream of packets for a new channel (requested by the user terminal) for up to a full duration of the multicast join window, or until it is stopped by an explicit message sent from the user terminal. Continuing the RCC burst at the full-rate throughout the multicast join window means that in most cases the RCC burst will collide with the multicast packets being sent to the user terminal, causing a temporary overload of the bottleneck link, e.g., a digital subscriber line (DSL) link and dropping of some packets at the DSL access multiplexer (DSLAM). However, it turns out that in spite of these losses, this RCC method can use substantially less bandwidth in the aggregation network and substantially less memory at the user terminal than other techniques heretofore known. These savings depend heavily on the fraction, "e", of excess bandwidth available on the access link for the RCC burst, as well as the multicast join time variability for the user terminal, the quality of service (QOS) capabilities of the DSLAM, and the roundtrip time between the user terminal and the RCC server that sends the RCC burst. In some realistic deployment scenarios, the savings of network bandwidth of the RCC process described herein, as compared with other RCC methods, can be very large.

Several different applications are possible depending on the QOS behavior and capabilities of the network element that is attached to the ingress of the bottleneck link on the path from the network to the user terminal, e.g., the DSLAM, in a deployment where the bottleneck link is DSL. In particular, the techniques described herein may be applied in somewhat different ways depending on: (i) the maximum depth of the output queues at the ingress to the bottleneck link; and (ii) the ability of the DSLAM to preferentially drop one type of traffic over another at the ingress to the bottleneck link during periods of congestion.

In addition, one or more "error repair" mechanisms are employed during a final phase of the RCC process. One mechanism is a request/response mechanism by which a user terminal requests particular packets to be sent when it discovers that they are missing from its buffer. Another mechanism is forward error correction (FEC) by which the user terminal can automatically replace missing packets using information received in a separate stream.

In the following description, it is assumed that the data rate of the primary video stream (multicast stream) is normalized to 1, and that the maximum available bandwidth on the bottleneck link is (1+e). However, one with ordinary skill in the art would understand that the techniques described herein may be applied to streams of any rate. The term "full rate" as used herein is meant to refer to a transmission rate that is up to the maximum available bandwidth of the bottleneck (access) link, i.e., 1+e.

Referring first to FIG. 1, a distribution network is shown at 10 for distributing programming content (e.g., video programs) to endpoints or terminals, referred to herein as user terminals at 20(1)-20(N). As mentioned above, each user terminal 20(*i*) may be a stand-alone STB that is connected to television (not shown), a television device having STB functions integrated therein or a personal computer or similar apparatus. In either case, each user terminal 20(i) has some degree of computing capability and data storage capability, but for simplicity those components of the user terminal are not shown in FIG. 1.

A programming source 30 multicasts a stream of programming where a stream corresponds to a channel of programming. For each channel there is a single programming (video) source 30 that sends the stream to a multicast group address. Any user terminal that wants to receive the stream/channel will "join" the multicast group (address), at which point the IP network 70 will arrange to have the packets sent to that group address delivered to the requesting user terminal. The multicast stream transmitted by the source 30 is also referred to herein as the primary stream.

An RCC (buffering) server 40 is connected to the source 30 and receives the same streams of data that the source 30 sends to the multicast groups for the channels it supports. The RCC server 40 comprises one or more data processors 42 and memory 44 that stores instructions for a bandwidth optimized RCC process instructions shown at reference numeral 100. The RCC server 40 continuously buffers packets associated with each of these streams for a time interval so that it can transmit buffered packets associated with a particular stream to a user terminal when a user terminal makes a channel change request, and until such time that the user terminal completes its joining of the multicast stream for the "new" channel contained in the channel change request. To this end, the RCC server 40 executes or performs the bandwidth optimized RCC process 100 that is described hereinafter. Communications among the source 30, RCC server 40 and DSLAM 50 is made by way of an IP network 70 in FIG. 1. The process 100 may be performed by executing software stored in a computer readable memory associated with RCC server 40. The process 100 is described in detail hereinafter in conjunction with the flow chart of FIG. 2 and the plots of FIGS. 3 and 4.

The process 100 may be implemented by logic encoded in one or more tangible media (e.g., embedded logic such as an application specific integrated circuit, digital signal processor instructions, software that is executed by a processor, etc.), where the memory 44 stores data used for the computations described herein (and/or software or processor instructions that are executed to carry out the computations described herein). Thus, the process 100 may be implemented with fixed logic or programmable logic (e.g., software/computer instructions executed by a processor).

The "final" link to a user terminal may be by way of a digital subscriber line (DSL) through its associated DSL access multiplexer (DSLAM). In this example, the DSL link is the so-called bottleneck link referred to above. For example, FIG. 1 shows a DSLAM 50 that connects to DSLs 60(1)-60(N). It is to be understood that typically a source 30 is connected to multiple DSLAMs to distribute the programming streams to a large number of user terminals. The fact that FIG. 1 shows that a single DSLAM, e.g., DSLAM 50, connects to the DSLs 60(1)-60(N) associated with user terminals 20(1)-20(N), respectively, is for simplicity and only by way of example. There are typically several DSLAMs that would serve a plurality of user terminals.

Figure 2:
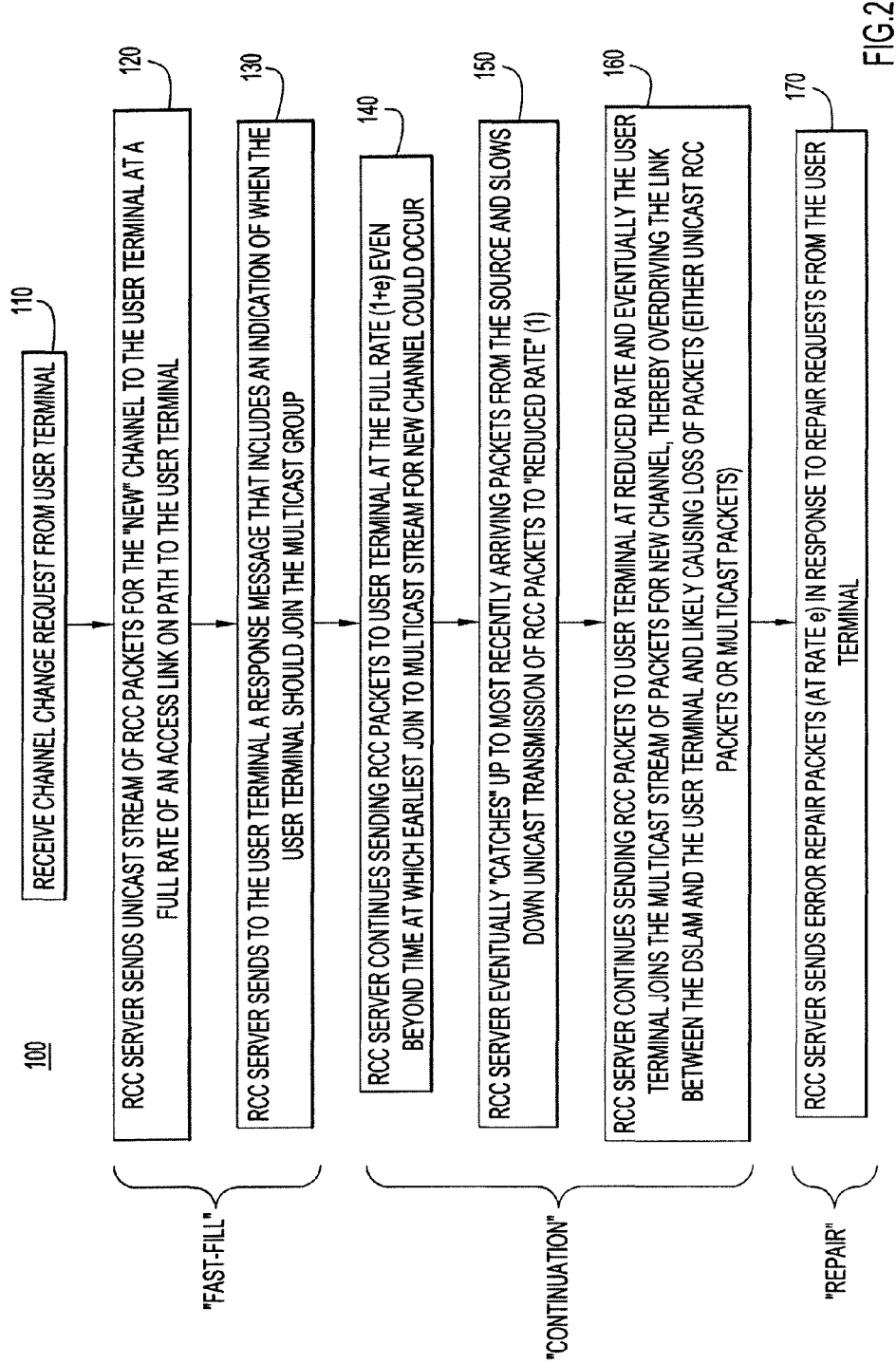
FIG. 2 is a flow chart depicting an example of the bandwidth optimized rapid channel change process according to one embodiment.
Figure 3:
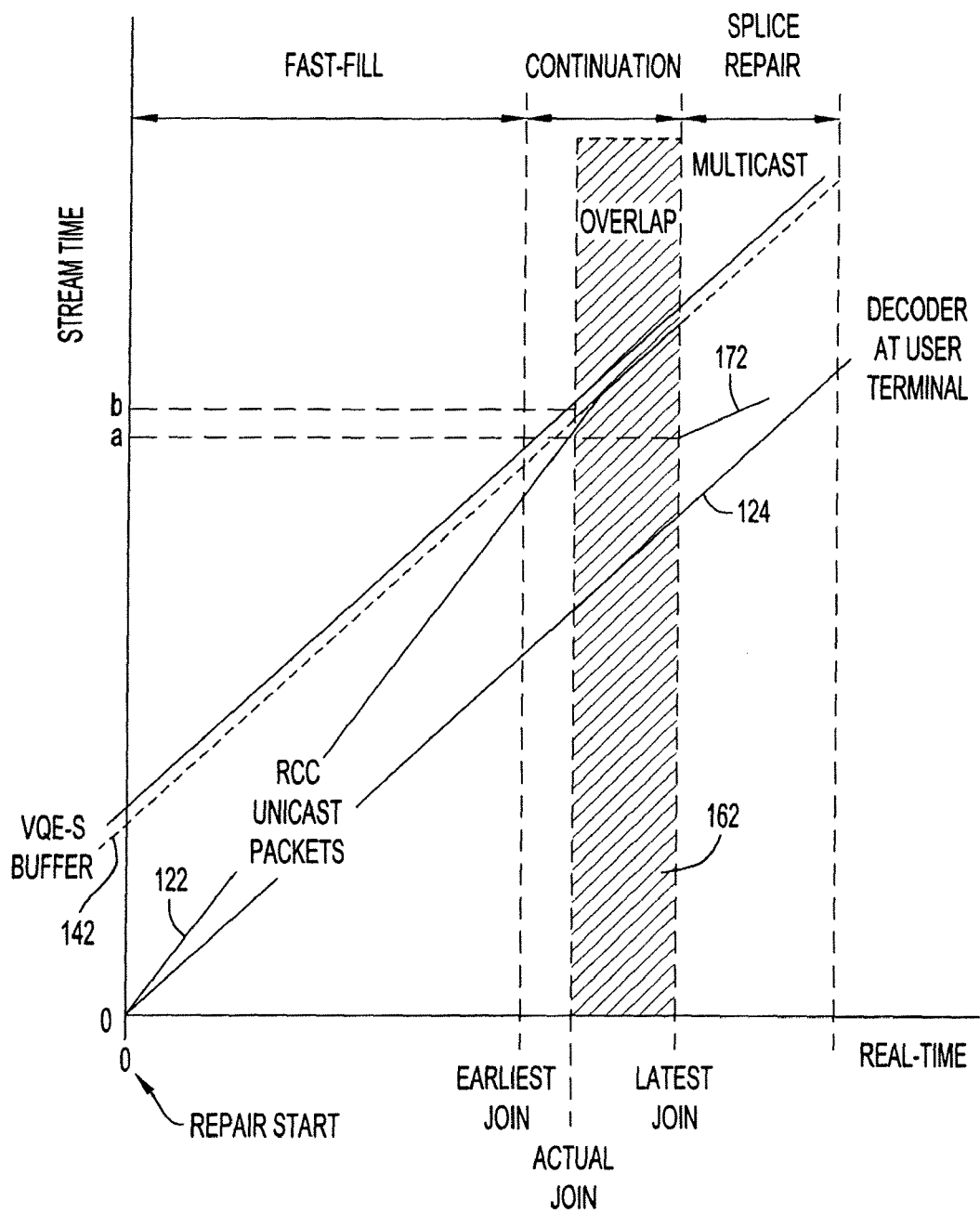
FIG. 3 is a plot depicting stages of the bandwidth optimized rapid channel change process.

Reference is now made to the flowchart of FIG. 2 and the plot in FIG. 3. The process 100 involves three distinct time intervals, the "fast-fill" interval, the "continuation" interval and the "splice repair" interval. Initially, however, the process 100 begins at 110 when the RCC server 40 receives a channel change request from a user terminal, e.g., any one of the user terminals 20(1)-20(N). At 120, the "fast-fill" interval with respect to that user terminal begins.

During the "fast fill" interval, the RCC server 40 sends to the requesting user terminal a unicast stream of packets at the full rate (1+e), where e is the excess bandwidth fraction that is available on the bottleneck access link, e.g., the DSL link in the example shown in FIG. 1. This full rate is faster than the playout rate of the decoder at the user terminal. This is represented by line 122 in FIG. 3. During this time, the user terminal is playing out the received content, at rate 1, as shown by the line 124 in FIG. 3. Since packets are arriving at the user terminal faster than they are being played out, the user terminal will be establishing a backlog of queued packets during this entire fast-fill interval. The amount of backlog keeps increasing, at rate e, as the fast-fill time gets longer and longer, with the total amount of backfill at any given point in time being represented in FIG. 3 by the distance between the lines 122 and 124. During the "fast fill" interval, no multicast packets are received, as the multicast join request for the new channel has not yet been issued.

It should be noted that the longer the fast fill interval, the larger the size of the maximum error gap that can be repaired by the user terminal without encountering an under-run. This is because once the multicast stream is being received at the user terminal, the maximum rate at which errors can be repaired is e (e<1), while the play-out continues at rate 1, so the amount of time that can elapse before an under-run occurs depends on how full the user terminal buffer was at the start of the repairs.

Immediately after the RCC server 40 receives the channel change request from the user terminal, at 130 the RCC server 40 computes a latest time when the user terminal could join the multicast stream (based on time of reception of the channel change request) and replies to the RCC request by sending a message back to the requesting user terminal. This reply includes, among other information, an indication of when the user terminal should join the multicast group. As explained hereinafter, when this time arrives, the user terminal issues an interne group management protocol (IGMP) join request which is directed to the IP network 70. The IP network 70 arranges to have the IP multicast stream delivered to the user terminal at some point after this IGMP join request is received.

The second section of the process 100 is called the "continuation" section. This interval starts at the earliest time at which the multicast join for the new channel may complete, which may occur some indeterminate period of time after the user terminal issues the request to the network to join the multicast group (i.e. after the time the user terminal issues an IGMP add membership message to request the stream associated with the desired channel). At 140, during this interval, the RCC server 40 continues to send the RCC burst at the full rate, even beyond the time at which the earliest join to the multicast stream for the new channel could occur. In fact, the RCC burst continues at the full rate until up to the latest possible multicast join completion time, or until the user terminal signals the RCC server 40 that the multicast join has completed.

At some point during the "continuation" portion of the RCC burst, it may become impossible for the RCC server to keep sending the burst at rate 1+e, because there may be no more data in the RCC server buffer. This occurs when the RCC burst "catches up" to the most recently arriving packets for the channel, and at this point the RCC server transmits the unicast stream at a reduced rate (e.g., rate 1) that is less than the full rate (1+e) referred to above and is equal to the rate at which new packets from the multicast stream are arriving from a source at the RCC server (40). Thus, during the "continuation" portion, the RCC server sends the unicast stream of packets to the user terminal at the full rate (1+e) or the reduced rate (1) depending on the availability of packets to be transmitted in the unicast stream. The boundary where this occurs on the RCC server is shown by the dashed line 142 in FIG. 3. In general, this boundary line will lie a small delay behind the current position of the multicast stream, since the RCC server 40 cannot re-transmit packets on the RCC stream until it has received them and buffered them from the multicast stream (received from the programming source 30). At 150, when the RCC burst reaches this boundary line during the "continuation" phase of the process 100, it begins to transmit packets in the RCC burst at the reduced rate as soon as they arrive at the RCC server 40 from the source 30 because there is an insufficient amount of packets available at the RCC server 40 to allow for further transmission of the unicast stream of packets at the full rate (1+e).

At some point during the "continuation" interval of the process 100, the multicast join will complete as indicated at 160 in the flowchart of FIG. 2. Again, when this happens is variable, but will occur sometime during the continuation interval based on knowledge of the network and related parameters. As the RCC burst continues, and after the multicast join completes, the link between the DSLAM and the user terminal will be over-driven, and some packets will be dropped at the DSLAM. The dropping of packets is caused by the combination of the unicast and multicast streams exceeding the maximum bandwidth of the access link, i.e., 1+e. When the RCC server transmits the unicast stream of packets at the full rate (1+e), the combined rate from the two streams is 2+e. When the RCC server transmits the unicast stream of packets at the reduced rate (1) due to packet availability, the combined rate from the two streams is 2. In either case, the combined rate is more than 1+e, therefore packets will be dropped.

The time interval during which this may occur is shown in cross-hatch at reference numeral 162 in the diagram. This over-driving of the link may continue until either (i) the end of the "continuation" portion of the burst is reached or (ii) an explicit message from the user terminal is received at the RCC server indicating that the multicast join has completed and that the "continuation" portion of the process 100 should end. It should be understood that at 160 the user terminal may transmit a message to the RCC server notifying it when multicast join is completed so that the RCC server stops sending RCC burst.

Once the continuation portion of the RCC has completed, there will, in general, be some gaps in the sequence of packets that have been received at the STB. These gaps may occur during the "continuation" region due to (i) the fact that the unicast packets sent in the RCC burst necessarily lag those on the multicast stream and (ii) the collisions and drops that occur during the overlap time interval 162, when the bottleneck (DSL) link is being overdriven.

At 170, the gaps in the packet stream that were introduced during the "continuation" interval associated with the "new" channel requested by the user terminal are repaired during the "splice repair" interval. During this time, the user terminal is receiving the multicast stream, so any repairs transmitted from the RCC server or a separate error repair server on the network (not shown) are performed only at rate e. The backfill of the user terminal's buffer that was introduced during the "fast fill" interval provides sufficient "padding" to allow all of the errors that were introduced during the splice to be repaired, at rate e, before the user terminal's buffer encounters an under-run.

Note that, unlike the packets sent during the "fast fill" and "continuation" intervals, the packets sent from the RCC server 40 during the "splice repair" interval are not actually part of the RCC burst itself. Instead, the packets sent during the "splice repair" interval are handled as ordinary error repair packets. After the continuation interval, the user terminal enables error repair sometime after the first multicast packets are received, and then begins to request repairs for the gaps that were introduced at the splice. The RCC server (or a separate error repair server on the network, not shown) responds to repair requests from the user terminal and sends those packets at rate e so that the gaps all get repaired at the rate shown by line 172 in FIG. 3. Note that the line 172 in FIG. 3 represents only the rate at which these gaps will be repaired, and not the exact packets which will be repaired, as the packets to be repaired may not form a contiguous range.

The number of packets that have been lost during the continuation region may be greatly affected by the QOS capabilities of the DSLAM, and also by the round trip time (RTT) for signaling between the user terminal and the RCC server. Consider, first of all, the case where the DSLAM supports differential QOS based on differentiated services code point (DSCP) markings, or on DSCP markings being propagated into the COS field of the 802.1p headers of the downstream packets. Further, assume that the RCC server 40 has been configured to send the RCC burst packets with a lower QOS priority DSCP marking than the primary multicast stream packets, so that during the overload portion of the continuation region, all of the multicast packets will get through, and some of the RCC packets will be dropped. In this case, the total size of the gap that is introduced by the "splice" in the continuation time interval is minimized, and is in fact, less than a distance from stream time instants "a" to "b" in the FIG. 3, i.e. the amount of time by which the RCC burst lags behind a position of the multicast stream for the new channel when the user terminal joins the multicast stream for the new channel. In the worst case, when the multicast join takes effect at its earliest possible time, the gap that is introduced will be less than or equal to the distance between the RCC burst and the multicast stream at this earliest join time.

Now consider the case where the DSLAM does not support differential or preferential drop for the RCC packets and the primary stream multicast packets. In this case, during the overlap portion, packets will be dropped in a somewhat arbitrary way. Some sequence numbers of packets for the "new" channel will be received twice at the user terminal (one copy from the primary stream and one from the RCC burst), some will be received once, and some will be received not at all. The total loss in this case is the number of distinct sequence numbers for which 0 copies are received. Though this is difficult to predict in general, in most cases no more than half the packets during the overlap period will end up with 0 copies having been received. This is not a critical assumption. Nothing substantial changes if it is assumed that all the packets are lost during the overlap. Moreover, in many cases the loss may be much smaller. For example, if the RCC and the primary stream each send the same range of sequence numbers during the overlap, and if the drops are random, then approximately ¼ of the sequence numbers would end up with 0 copies having been received. However, what really determines the number of packets lost in this case is the total duration of the overlap interval.

Thus, in general, the unicast stream of packets may be transmitted with a lower priority quality of service marking than a quality of service marking associated with the multicast stream of packets such that total time duration of a gap introduced by transmission of the unicast stream of packets is minimized. In one case, the unicast stream of packets with the lower priority quality of service marking is transmitted such that the total time duration of the gap introduced by transmission of the unicast stream of packets is less than an amount of time by which the transmission of the unicast stream lags the multicast stream at a point in time where the user terminal joins the multicast stream.

Although it is not shown in FIG. 3, the overlap region will, in general, end not at the end of the multicast join interval, but when an explicit message is received from the user terminal notifying the RCC server 40 that the first packet from the multicast stream has been received. How quickly this can be done depends, primarily, on the RTT between the RCC server and the user terminal. Thus, the overlap region can be assumed to be approximately as long as the RTT. Assuming, for example, that ½ the packets are lost during this interval, the losses introduced at the splice increase as ½*RTT (plus the loss due to the gap from a to b in FIG. 2).

Figure 4:
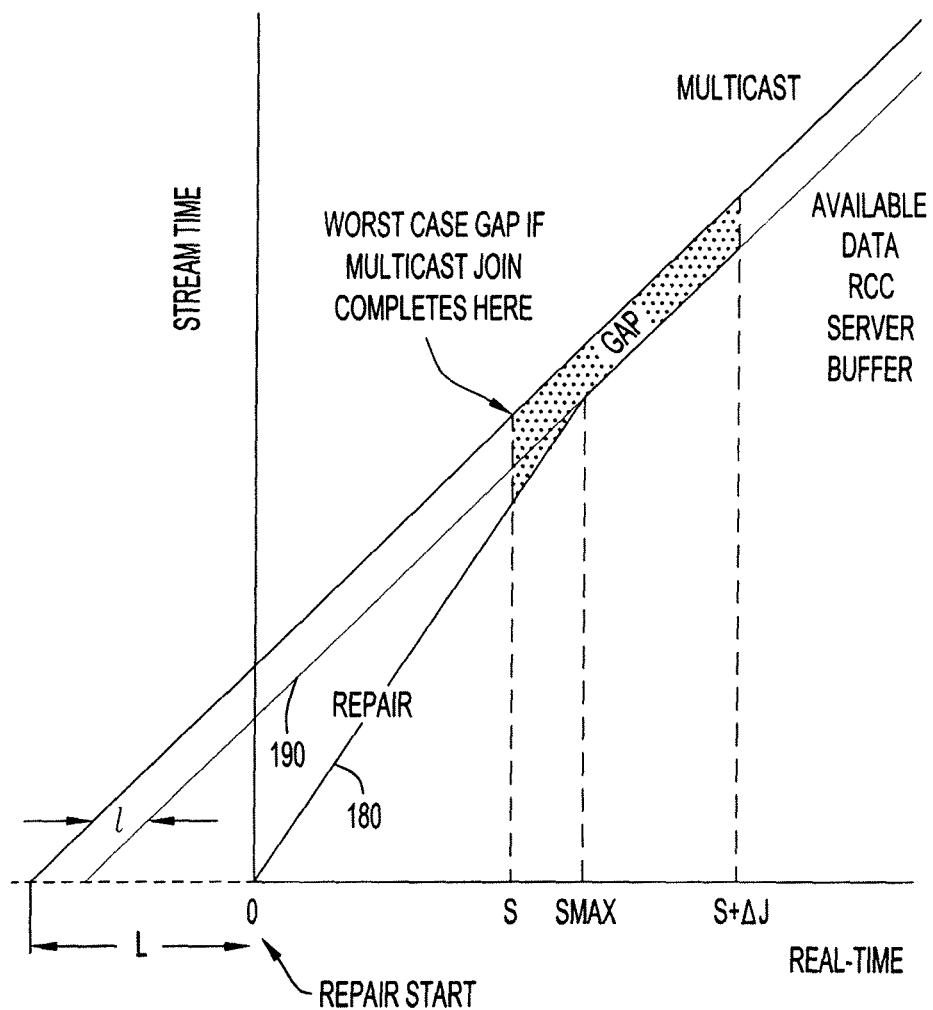
FIG. 4 is another plot that depicts calculations for parameters of the bandwidth optimized rapid channel change process.

Reference is now made to FIG. 4 for a description of an analysis of the process 100 described above with respect to two quantities:

1. If the earliest multicast join time is set to be time S, how large will the gap, X(S) be that is introduced at the splice? If the "fast fill" part of the RCC burst ends at time S, what is the maximum number of errors that could be repaired, A(S), starting at the end of the "continuation" interval, before there is an under-run of the user terminal's buffer?

2. If the value of S for which X(S)=A(S) is determined, then the minimum size of the "fast fill" region which will suffice to repair the errors introduce at the splice is determined, and this is what is needed to determine the complete burst parameters.

When the user terminal sends a channel change request to the RCC server, the RCC server begins the resultant unicast burst with an Intra-coded frame (I-frame). This so-called I-frame is a well known feature of the MPEG standards, and allows the user terminal to decode and display the video for the new channel immediately, once it has received the complete I-frame. Without an RCC server, the user terminal would have to wait until it received an I-frame on the multicast stream before it could display any video, i.e. up to a full GOP delay.

Referring to FIG. 4, let L be the lag behind the multicast stream of a candidate I-frame to be used as the starting point for the unicast burst sent from the RCC server to the user terminal in response to the RCC request, ΔJ is the multicast join variability. l is the lag time of the most recent packets in the RCC server buffer behind the multicast stream.

First, A(S) is calculated to determine the number of errors that can be repaired without an under-run as a function of the length of the "fast fill" leg of the RCC burst. This computation is made based on the following model:

From time 0 until time S, packets are being added to the user terminal's buffer, without any gaps, at a rate of 1+e from the RCC burst packet stream, and being drained out of the user terminal's buffer at a rate of 1 by the decoder in the user terminal.

At time S, there is a loss of X(S) consecutive packets, creating a gap of this size in the user terminal's buffer. Then, no more packets are lost for the rest of the "continuation" interval. During the entire "continuation" interval, packets are being played out at a rate of 1 from the user terminal's buffer. Packets are also being added to the user terminal's buffer from either the RCC burst, the multicast stream or both. However, any packets added to the user terminal's buffer during this time are being added after the gap of X(S) packets, and therefore do nothing to help prevent an under-run. Note that the assumption that all X(S) packets get dropped consecutively at the start of the "continuation" interval represents the worst case in terms of preventing an under-run. If the drops were more spread out over the "continuation" interval, then there would be somewhat more time to repair the later drops before encountering an under-run.

Starting at time S+ΔJ, the error repair phase begins to repair the missing packets in the gap that was introduced during the "continuation" interval. It is assumed that these packets are repaired in order, and that they are repaired at rate e. Therefore, during this time interval, the size of the user terminal buffer before the gap is decreasing at a rate of 1 due to the decoder play-out, but at the same time is increasing at a rate of e due to the error repair of consecutive packets in the gap.

Let K(t) be the size of the data, measured in time at stream rate, in the user terminal buffer before the first gap in the user terminal buffer. According to the above model, $K(t)=et$, for $t \leq S$ $K(t)=eS-(t-S)$, for $S<t<S+\Delta J$ $K(t)=eS-\Delta J-(t-S-\Delta J)(1-e)$ for $t \geq S+\Delta J$ \hfill (1)

Looking at the third case in the above, it is evident that K(t) will be 0, which means the buffer will under-run, when $$t = \frac{Se - \Delta J}{(1-e)}.$$

During this time, packets can be repaired at a rate of e, so $$A(S) = \frac{(Se - \Delta J)e}{1-e} \hfill (2)$$

Note that equation (2) applies only for values of S where the transmitted unicast burst has not yet "caught up" with the received multicast stream, as described above, and where the unicast burst may therefore still be sent at rate (1+e). Assuming that the I-frame started from is L seconds behind the multicast stream, and buffering occurs in the RCC server up until l seconds behind the multicast stream, the unicast burst will catch up with the multicast stream at time Smax. This can be calculated by intersecting the extension of the initial segment of the repair packets line 180 with the boundary line 190 associated with the RCC server buffer shown in FIG. 4, as $$S_{max} = \frac{L-l}{e} \hfill (3)$$

At this point, the RCC burst can no longer be transmitted at a rate greater than 1, so the maximum available error repair does not increase as S increases. Therefore, $$A(S) = \frac{(Se - \Delta J)e}{1-e}, \quad \text{for } S \leq \frac{L-l}{e} \hfill (4)$$

$$A(S) = \frac{(L-l-\Delta J)e}{1-e}, \quad \text{for } S > \frac{L-l}{e}$$

For purposes of calculating the maximum gap that needs to be repaired at the splice, the worst case gap is determined as a function of the start of the multicast join interval. It turns out that the worst case occurs when the multicast join completes as early as possible within the interval, i.e. when the actual join time coincides with the earliest join time in FIG. 3. Also, the gap consists of two components: (i) the distance from the RCC burst line to the current position of the multicast stream, which is given by L−es; and (ii) a extra term, E, which is designed to cover the loss during the overlap region in the case where the DSLAM does not provide QOS support and thus packets from the unicast stream or the multicast stream cannot be differentially/preferentially dropped (E is set to 0 when the DSLAM does have QOS support). The gap is:

$$X(S) = L - eS + E, \quad \text{for } S \le \frac{L-l}{e} \quad (5)$$

$$X(S) = l + E, \quad \text{for } S > \frac{L-l}{e}$$

Solving the first cases of equations (4) and (5) together for S gives the earliest join time, $$S_{join} = \frac{(L+E)(1-e)}{e} + \Delta J \quad (6)$$

provided that $$L \ge \frac{l + E(1-e)}{e} + \Delta J \quad (7)$$

If $$L < \frac{l + E(1-e)}{e} + \Delta J,$$

then the I-frame starting at L is not a feasible starting point because the second cases of (4) and (5) do not actually depend on S and therefore cannot be solved together for S. This is because for values of S beyond Smax, the depth of the buffered backlog in the user terminal will no longer be increasing (stream sent and consumed at rate 1) and the error gap will no longer be decreasing (it will always be l+E).

The total size of the data sent, $\overline{D}$, as part of the RCC burst using this method consists of 3 parts: (i) a first leg of the RCC that runs at rate 1+e, which runs up to Smax; (ii) a second leg of the RCC burst that tracks the received stream on the RCC server at rate 1, starting at time Smax; and (iii) the errors that are repaired due to the splice. The first two of these can be computed exactly while the third is a distribution that depends on the multicast join latency distribution. The third component is approximated using the worst case, which occurs when the multicast join happens at its earliest point in the join window. The second leg may be null in cases where the entire multicast join latency can be covered between the earliest join time and Smax. In order to simplify this calculation, though, it is assumed that the entire first and second legs run at rate 1+e, i.e., that the second leg is always null. This should not make much difference unless the multicast join variability is very long. The total data sent is approximated as $$(S_{join} + \Delta J)(1+e) + X(S_{join}) = \frac{L+E}{e} + (2+e)\Delta J \quad (8)$$

The mean value of L will be ½ GOP beyond the minimum value, which is $$\frac{l + E(1-e)}{e} + \Delta J.$$

So $$\overline{D} = \frac{l+E}{e^2} + \frac{G}{2e} + \left(2 + e + \frac{1}{e}\right)\Delta J \quad (9)$$

where G is the duration/size of the GOP.

The amount of buffering required on the RCC server and on the user terminal can be calculated as follows. In both places, the required buffering, Bmax, is a maximum value of L which would be needed in the case where the only available I-frame in the RCC server buffer is a full GOP time away from the minimum given above.

$$B_{max} = \frac{l + E(1-e)}{e} + \Delta J + G \quad (10)$$

The bandwidth optimized RCC process 100 described herein requires, on average, shorter unicast bursts than prior methods, and as a result uses less bandwidth. The average total size of the data sent with the process 100 is given by equation (9) above. By comparison, the average total size of the data sent with another commonly used method is given by $$\overline{D}_0 = \frac{l + \Delta J}{e^2} + \frac{G}{2e} \quad (11)$$

Comparing (10) and (11), in cases where e is small (close to 0) the $$\frac{\Delta J}{e^2}$$

term can become very large in the latter, causing the average burst size in the other RCC method to be much longer. For example, using some fairly realistic values for the various quantities in these formulae, if we assume that e=0.1, l=5 ms, G=1 sec, $\Delta J$=250 ms, and E=0, then (10) gives an average burst size of 8.525 seconds, while (11) gives an average burst size of 30.5 seconds.

Similarly, the process 100 described herein requires less buffering capability on the user terminal and on the RCC server than other methods heretofore known.

The error repair mechanism is presumed through much of this analysis to be provided via an on-demand request/response mechanism. However, the model and general method of analysis may be applied to a scenario in which a different error repair mechanism (such as Forward Error Correction) is used, or where a combination of mechanisms are used. In such scenarios, the exact formula for the number of errors that can be repaired for a given level of buffer backfill on the user terminal (A(S)) may change, but the method of analysis would still apply.

If the error repair mechanism is provided via an on-demand request/response mechanism, the RCC server may also supply the error repair capability, as in the foregoing description, or the error repair capability may be supplied by an entirely different entity.

The exact behavior of the network during the period of congestion may vary depending on the nature of the network elements in the path from the RCC server to the user terminal and their QOS capabilities. In particular, different network elements may have different degrees of buffering and may therefore provide different amounts of "elasticity" during, and after, the period of congestion. In cases where network elements in the path provide a large amount of buffering, packets that were sent during the congestion period may be delayed in the network rather than dropped. This situation can be handled within the framework of the process 100 as follows:

The user terminal may be configured to not begin requesting error repair until after it stops receiving packets from the initial RCC burst for a period of time, e.g. for several packet times at the reduced rate of e. This will ensure that packets that were queued in the network during the congestion period have been received at the user terminal before repairs are requested, preventing a possible positive feedback situation. The calculations for burst timing and feasibility for a given RAP may be reworked in order to account for the extra packets that will arrive at the user terminal after the end of the RCC burst itself, and also to account for the extra delay that is required in order to allow the network buffers to clear before error repair can begin.

The foregoing description refers to the RCC server as receiving the multicast stream from the same source as the user terminal. However, the method may also be applied to a model in which the RCC server is itself the source of the multicast stream.

Some of the distinguishing features of the process 100 as compared with other RCC methods are:

Continuation of the "fast" portion of the RCC burst beyond the point of the earliest multicast join time.

Use of a generic error repair mechanism rather than the RCC burst itself to repair gaps in the packet sequence that occur in the region of the "splice" between the unicast and the multicast packets.

The method of calculating the parameters of the RCC burst which relies on a comparison of the number of missing packets in the region of the splice and the number of errors that can be repaired as a function of the duration of the RCC burst. (The comparison of X(S) and A(S) in the foregoing analysis.) The unicast stream of packets may be transmitted for a time duration that is based on a comparison of an estimate of a number of missing packets during a time period when the user terminal joins the multicast stream and a number of errors that can be repaired at the user terminal. Furthermore, the estimate of the number of missing packets may be based on a situation where the unicast stream of packets can be preferentially dropped over the packets from the multicast stream, or based on a situation where packets from either stream cannot be preferentially dropped over packets from the other stream.

Application of the method for calculating the parameters of the RCC burst to the case where the DSLAM (in general the network element at the ingress to the bottleneck link) supports a QOS policy where packets from the unicast burst will be dropped in preference to multicast packets.

Application of the method for calculating the parameters of the RCC burst to the more general case where the DSLAM (in general the network element at the ingress to the bottleneck link) does not support a QOS policy where packets from the unicast burst will be preferentially dropped. (This case is covered in the above analysis when E>0.) Thus, when packets from the unicast stream of packets and/or the multicast stream of packets cannot be preferentially dropped, transmitting comprises transmitting the unicast stream of packets for a time duration that is computed based on an estimate of packet loss during a time period when the user terminal joins the multicast stream as $$\overline{D} = \frac{l+E}{e^2} + \frac{G}{2e} + \left(2 + e + \frac{1}{e}\right)\Delta J,$$

where E is the estimated packet loss, e is an incremental rate amount associated with the full rate and G is the duration of the GOP interval.

Use of an explicit signal from the user terminal to the RCC server to terminate the RCC burst once the multicast join has completed. This is especially valuable in keeping E small in cases where the DSLAM does not support differential drop.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising: receiving a channel change request from a user terminal in an internet protocol television network, wherein the channel change request indicates a request for packets for a new channel of programming; computing a latest time when the user terminal could join a multicast stream based on time of reception of the channel change request; and in response to the channel change request, transmitting a unicast stream of packets for the new channel to the user terminal at a full rate of an access link on a path to the user terminal and continuing to transmit the unicast stream of packets at the full rate of the access link beyond an earliest time when the user terminal could join the multicast stream of packets for the new channel and until insufficient packets are available for transmission at the full rate at which time packets are transmitted at a rate which is equal to a rate at which new packets are received from a source until the latest time or until reception of a message from the user terminal indicating that the user terminal has joined the multicast stream of packets for the new channel.

2. The method of claim 1, and further comprising transmitting error repair packets to the user terminal in response to repair requests received from the user terminal, wherein said repair requests are made by the user terminal on the basis of errors in packets received by the user terminal.

3. The method of claim 2, wherein said repair requests are made by the user terminal on the basis of errors in packets received by the user terminal caused by over-driving of the access link to the user terminal by transmitting the unicast stream of packets for a period of time that at least partially overlaps with reception of the multicast stream of packets for the new channel by the user terminal.

4. The method of claim 2, wherein said repair requests are made by the user terminal on the basis of errors in packets received by the user terminal caused by the unicast stream of packets necessarily lagging behind a position of the multicast stream for the new channel when the user terminal joins the multicast stream for the new channel.

5. A method comprising:
receiving a channel change request from a user terminal in an internet protocol television network, wherein the channel change request indicates a request for packets for a new channel of programming; and
in response to the channel change request, transmitting a unicast stream of packets for the new channel to the user terminal at a full rate of an access link on a path to the user terminal and continuing to transmit the unicast stream of packets at the full rate of the access link beyond an earliest time when the user terminal could join a multicast stream of packets for the new channel, wherein transmitting comprises transmitting the unicast stream of packets with a lower priority quality of service marking than a quality of service marking associated with the multicast stream of packets to cause all of the multicast packets to get through to the user terminal whereas some of the packets for the new channel are dropped and do not get through to the user terminal during a time period beyond the earliest time when the unicast stream is transmitted at the full rate of the access link thereby minimizing a total time duration of a gap in a sequence of packets received by the user terminal as a result of packet collisions between packets from the multicast stream and packets from the unicast stream and packet drops from the unicast stream that occur during the time period.

6. The method of claim 5, wherein transmitting comprises transmitting the unicast stream of packets with the lower priority quality of service marking such that when the user terminal joins the multicast stream at an earliest possible time, the total time duration of the gap introduced by transmission of the unicast stream of packets is less than an amount of time by which the transmission of the unicast stream lags the multicast stream at a point in time where the user terminal joins the multicast stream.

7. A method comprising:
receiving a channel change request from a user terminal in an internet protocol television network, wherein the channel change request indicates a request for packets for a new channel of programming; and
in response to the channel change request, transmitting a unicast stream of packets for the new channel to the user terminal at a full rate of an access link on a path to the user terminal and continuing to transmit the unicast stream of packets at the full rate of the access link beyond an earliest time when the user terminal could join a multicast stream of packets for the new channel, wherein transmitting comprises transmitting the unicast stream of packets for a time duration that is based on a comparison of an estimate of a number of missing packets during a time period when the user terminal joins the multicast stream and a number of errors that are reparable at the user terminal.

8. The method of claim 7, and further comprising computing the estimate of the number of missing packets based on an assumption that the unicast stream of packets are preferentially dropped in favor of the packets from the multicast stream.

9. The method of claim 7, and further comprising computing the estimate of the number of missing packets based on an assumption that packets from either stream are not preferentially dropped over packets from the other stream.

10. An apparatus comprising: one or more processors; memory coupled to the one or more processors, wherein the memory stores instructions executable by the one or more processors and when executed by the one or more processors cause the processors to: receive a channel change request from a user terminal in an internet protocol television network, wherein the channel change request indicates a request for packets for a new channel of programming; compute a latest time when the user terminal could join a multicast stream based on time of reception of the channel change request; and in response to the channel change request, transmit a unicast stream of packets for the new channel to the user terminal at a full rate of an access link on a path to the user terminal and continuing to transmit the unicast stream of packets at the full rate of the access link beyond an earliest time when the user terminal could join the multicast stream of packets for the new channel and until insufficient packets are available for transmission at the full rate at which time packets are transmitted at a rate which is equal to a rate at which new packets are received from a source until the latest time or until reception of a message from the user terminal indicating that the user terminal has joined the multicast stream of packets for the new channel.

11. The apparatus of claim 10, and further comprising instructions stored in the memory that cause the one or more processors to transmit error repair packets to the user terminal in response to repair requests received from the user terminal, wherein said repair requests are made by the user terminal on the basis of errors in packets received by the user terminal.

12. An apparatus comprising:
one or more processors;
memory coupled to the one or more processors, wherein the memory stores instructions executable by the one or more processors and when executed by the one or more processors cause the processors to:
receive a channel change request from a user terminal in an internet protocol television network, wherein the channel change request indicates a request for packets for a new channel of programming;
in response to the channel change request, transmit a unicast stream of packets for the new channel to the user terminal at a full rate of an access link on a path to the user terminal and continuing to transmit the unicast stream of packets at the full rate of the access link beyond an earliest time when the user terminal could join a multicast stream of packets for the new channel;
wherein the instructions that cause the processor to transmit comprise instructions to transmit the unicast stream of packets with a lower priority quality of service marking than a quality of service marking associated with the multicast stream of packets causing all of the multicast packets to get through to the user terminal whereas some of the packets for the new channel are dropped and do not get through to the user terminal during a time period beyond the earliest time when the unicast stream is transmitted at the full rate of the access link thereby minimizing a total time duration of a gap in a sequence of packets received by the user terminal as a result of packet collisions between packets from the multicast stream and packets from the unicast stream and packet drops from the unicast stream that occur during the time period.

13. The apparatus of claim 12, wherein the instructions that cause the one or more processors to transmit comprise instructions that cause the one or more processors to transmit the unicast stream of packets with the lower priority quality of service marking such that when the user terminal joins the multicast stream at an earliest possible time, the total time duration of the gap introduced by transmission of the unicast stream of packets is less than an amount of time by which the transmission of the unicast stream lags the multicast stream at a point in time where the user terminal joins the multicast stream.

14. The apparatus of claim 10, wherein the instructions that cause the one or more processors to transmit comprise instructions that cause the one or more processors to transmit the unicast stream of packets for a time duration that is based on a comparison of an estimate of a number of missing packets during a time period when the user terminal joins the multicast stream and a number of errors are reparable at the user terminal.

15. A computer readable memory device storing instructions that, when executed by a processor, are operable to cause the processor to: receive a channel change request from a user terminal in an internet protocol television network, wherein the channel change request indicates a request for packets for a new channel of programming; compute a latest time when the user terminal could join a multicast stream based on time of reception of the channel change request; and in response to the channel change request, transmit a unicast stream of packets for the new channel to the user terminal at a full rate of an access link on a path to the user terminal and continuing to transmit the unicast stream of packets at the full rate beyond an earliest time when the user terminal could join the multicast stream of packets for the new channel and until insufficient packets are available for transmission at the full rate at which time packets are transmitted at a rate which is equal to a rate at which new packets are received from a source until the latest time or until reception of a message from the user terminal indicating that the user terminal has joined the multicast stream of packets for the new channel.

16. The computer readable memory device of claim 15, and further comprising instructions that cause the processor to transmit error repair packets to the user terminal in response to repair requests received from the user terminal, wherein said repair requests are made by the user terminal on the basis of errors in packets received by the user terminal.

17. A computer readable memory device storing instructions that, when executed by a processor, are operable to cause the processor to:
receive a channel change request from a user terminal in an internet protocol television network, wherein the channel change request indicates a request for packets for a new channel of programming;
in response to the channel change request, transmit a unicast stream of packets for the new channel to the user terminal at a full rate of an access link on a path to the user terminal and continuing to transmit the unicast stream of packets at the full rate of the access link beyond an earliest time when the user terminal could join a multicast stream of packets for the new channel;
wherein the instructions that cause the processor to transmit the unicast stream comprise instructions that cause the processor to transmit the unicast stream of packets with a lower priority quality of service marking than a quality of service marking associated with the multicast stream of packets causing all of the multicast packets to get through to the user terminal whereas some of the packets for the new channel are dropped and do not get through to the user terminal during a time period beyond the earliest time when the unicast stream is transmitted at the full rate of the access link thereby minimizing a total time duration of a gap in a sequence of packets received by the user terminal as a result of packet collisions between packets from the multicast stream and packets from the unicast stream and packet drops from the unicast stream that occur during the time period.

* * * * *